Aug. 10, 1937.　　　E. W. SWANSON　　　2,089,448
SYNCHRONIZING DEVICE
Filed May 4, 1936　　　3 Sheets-Sheet 1

INVENTOR
EDWIN W. SWANSON
BY Akel C. Benson
HIS ATTORNEY

Aug. 10, 1937.  E. W. SWANSON  2,089,448
SYNCHRONIZING DEVICE
Filed May 4, 1936  3 Sheets—Sheet 2
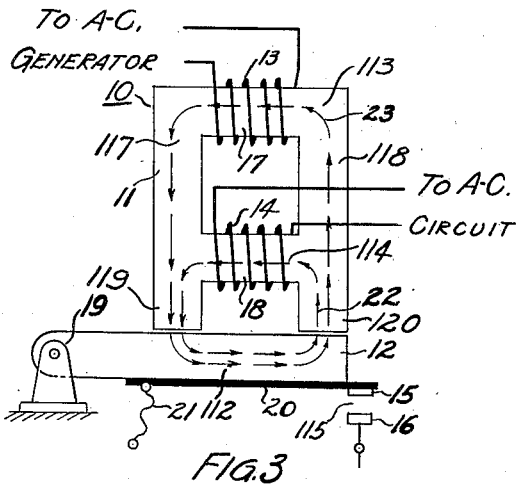
FIG.3
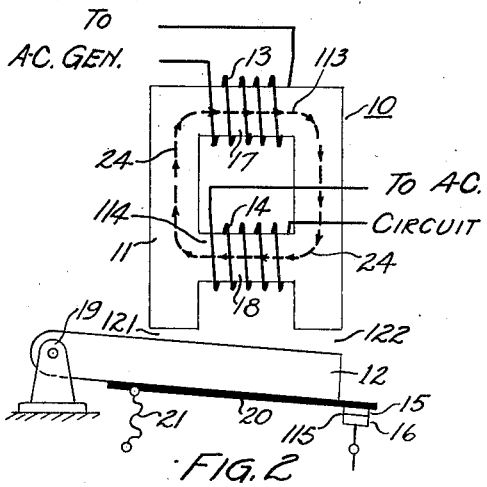
FIG.2
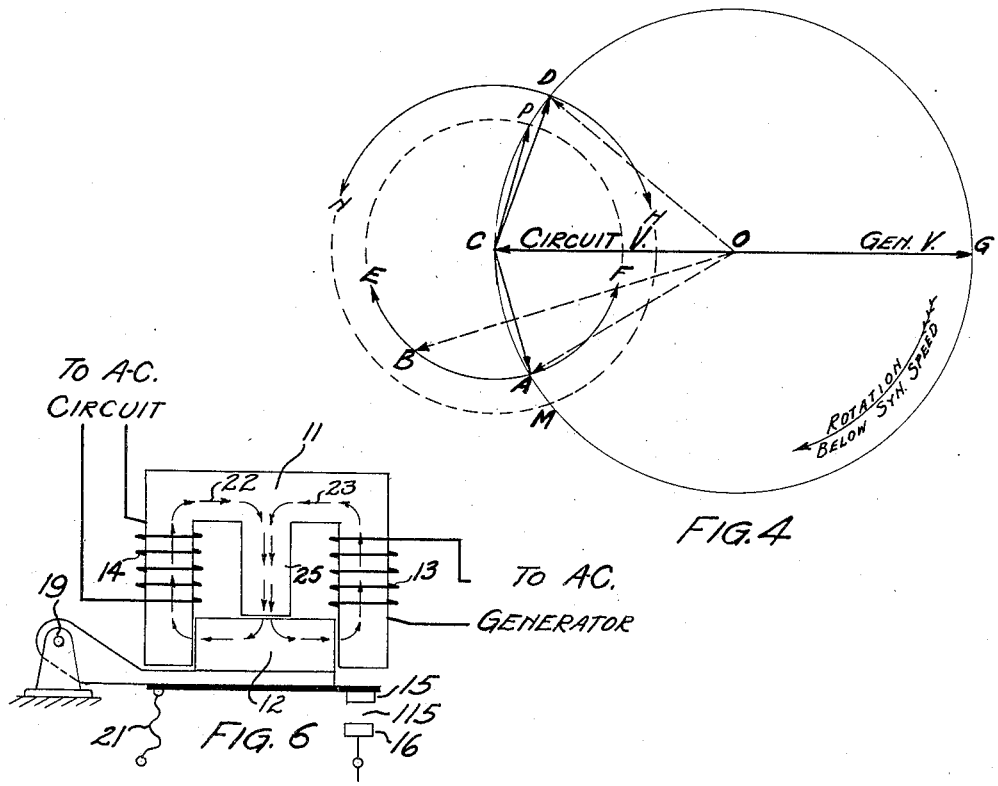
FIG.4
FIG.6
INVENTOR.
EDWIN W. SWANSON
BY Akel C. Benson
HIS ATTORNEY Patented Aug. 10, 1937

2,089,448

UNITED STATES PATENT OFFICE 2,089,448

SYNCHRONIZING DEVICE

Edwin W. Swanson, Hopkins, Minn., assignor to Electric Machinery Manufacturing Company, Minneapolis, Minn.

Application May 4, 1936, Serial No. 77,765

13 Claims. (Cl. 171—118)

My invention relates to synchronizing devices for automatically paralleling sources of alternating current and has for an object to provide a synchronizing device which is inexpensive and simple in construction.

Another object of the invention resides in providing a synchronizing device which is extremely positive in action and reliable in operation.

A still further object of the invention resides in providing a synchronizing device which has a minimum number of moving parts and which will not readily get out of order.

Another object of the invention resides in providing a synchronizing device which does not require an expert to install, adjust, or operate it.

An object of the invention resides in providing a synchronizing device in which the paralleling operation of one source of alternating current to the other is initiated at a positively fixed predetermined angle in advance of phase coincidence.

In carrying out the objects of my invention, I utilize a magnetic core having three magnetic paths, one of the paths being constructed with an air gap adapted to be closed by a movable armature, and arranged with windings on two of the portions of the said core forming the other two paths and connected to the sources of alternating current so as to cause flux to flow through said air gap when the voltages of the sources are out of phase and differ in frequency and connected so as to cause substantially complete elimination of flux through the air gap when the voltages are substantially alike in frequency and phase.

My synchronizing device is applicable to single-phase, three-phase, and other polyphase electric systems without change, but for the sake of simplicity it will be shown and illustrated for use only with a three-phase system.

These and other objects and advantages of the invention will be fully set forth in the following description made in connection with the accompanying drawings, in which like reference characters refer to similar parts throughout the several views, and in which:—

Fig. 2 is a diagrammatic view of the synchronizer shown in Fig. 1 with the armature in one position.

Fig. 3 is a view similar to Fig. 2 showing the armature in another position.

Fig. 4 is a vector diagram showing the relation of the various voltages occuring in the operation of my synchronizing device.

Fig. 6 is a view similar to Fig. 3 of another form of synchronizer.

Figure 1:
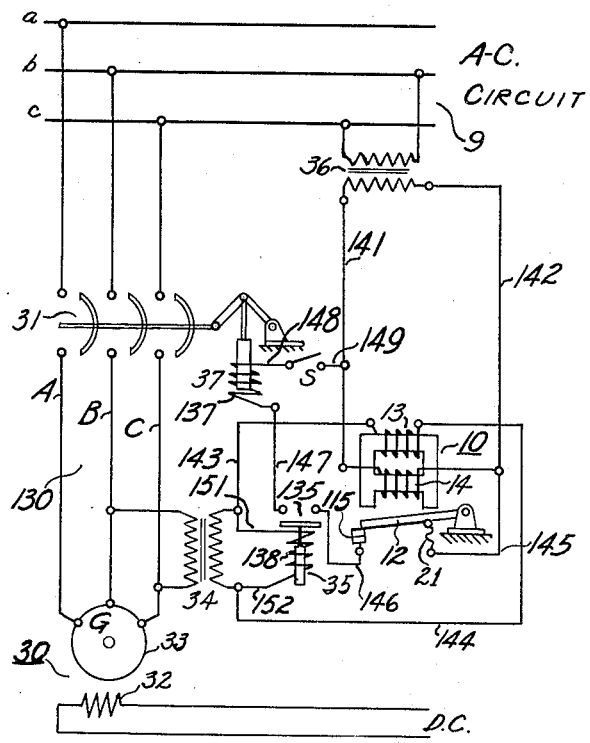
Fig. 1 is a wiring diagram of a synchronizing device illustrating an embodiment of my invention.

The synchronizing device includes a novel synchronizer which I have indicated in its entirety by the reference numeral 10, together with circuit closing means or circuit breaker 31, and actuating mechanism therefor and circuits associated therewith. These various parts of the invention will now be described in detail.

The synchronizer 10 comprises a laminated magnetic core 11 which is constructed with two legs 17 and 18 connected together by means of two end pieces 117 and 118. These end pieces extend outwardly beyond the leg 18 to form pole pieces 119 and 120. An armature 12 pivoted at 19 to some point fixed relative to the core 11, extends across the pole pieces 119 and 120 and is adapted to swing toward and from these pole pieces to form air gaps 121 and 122 when in the position shown in Fig. 2. The armature 12 and core 11 are preferably arranged so that the armature drops by gravity to the position shown in Fig. 2 when no magnetic flux flows through the air gaps 121 and 122. When the armature is moved to the position shown in Fig. 3 the air gaps 121 and 122 are closed. It will be thus seen that armature 12, air gaps 121 and 122, and pole pieces 119 and 120 form one magnetic path, that leg 18 forms a second magnetic path, and that leg 17, and end pieces 117 and 118 form a third magnetic path. These paths have been indicated by the reference numerals 112, 114 and 113 respectively. By means of the construction utilized, two magnetic circuits are provided. One of these circuits is shown in Fig. 3 and comprises two branch circuits 22 and 23 which are in parallel. Branch circuit 22 includes magnetic paths 112 and 114, while branch circuit 23 includes magnetic paths 112 and 113. The other magnetic circuit is indicated at 24 and is shown in Fig. 2. This circuit includes only the magnetic paths 113 and 114.

On the leg 17 is disposed a potential winding 13 while on the leg 18 is disposed another potential winding 14. These windings are energized by the potential of the two sources to be paralleled and are constructed so that the flux resulting from each winding is substantially the same magnitude when the voltages are equal.

Operating in conjunction with the armature 12 is a switch 115 which comprises contacts 15 and 16. Contact 15 is carried by the armature 12 and is connected to an electric conductor 20 on said armature which conductor in turn is connected to a flexible conductor 21. Contact 16 is fixed. When the armature is in the position shown in Fig. 3 the switch 115 is open. When the armature opens, the switch is closed as shown in Fig. 2.

For the purpose of illustrating the application of the invention, a three-phase alternating-current circuit 9 has been shown which is connected to a suitable source of three-phase alternating current not illustrated. This circuit will be hereinafter referred to as the a-c. circuit and includes three conductors a, b, and c. In addition a three-phase generator 30 has been shown which includes an armature 33 and a field winding 32, said field winding being energized from any suitable source of direct current, not shown. To the armature 33 is connected a three-phase circuit 130 consisting of three conductors A, B and C. This circuit is connected to the a-c. circuit 9 by means of a circuit breaker 31, the conductors A, B and C of the generator circuit 130 being respectively connected to the conductors a, b and c of the a-c. circuit 9. The circuit breaker 31 may be of any conventional form and is operated by an electromagnet 37 having an actuating coil 137. Since the mechanism operated by this electromagnet 37 for closing the circuit breaker does not form any feature of the invention, it has not been shown in detail and no description thereof will be given.

The method of connecting the synchronizing device to the circuits 9 and 130 will now be described in detail.

For energizing winding 14 a potential transformer 36 is employed, the primary of which is connected to the conductors b and c of the a-c. circuit 9. To the secondary of this transformer are connected conductors 141 and 142 which are connected directly to the potential winding 14. For energizing winding 13 a similar potential transformer 34 is employed, the primary of which is connected to the conductors B and C. To the secondary of this transformer are connected conductors 143 and 144 which are similarly connected to the winding 13. Where the generator and a-c. circuit voltages are sufficiently low to accommodate the windings 13 and 14 directly, the transformers 34 and 36 may be omitted.

Switch 115 actuated by armature 12 of synchronizer 10 is connected in a circuit which I have termed the synchronizing circuit. This circuit functions to close the circuit breaker 31 when the voltages of the sources of alternating current to be paralleled are substantially alike in frequency and phase. This circuit will now be described in detail. Contact 15 of switch 115 is as previously stated connected to conductor 20 which in turn is connected to flexible conductor 21. Flexible conductor 21 is connected by means of a conductor 145 with conductor 142 leading from transformer 36. Contact 16 of switch 115 is connected by means of a conductor 146 with a switch 135 of a potential relay 35, to be presently further described. Switch 135 is connected by means of a conductor 147 to the coil 137 of electromagnet 37. A conductor 148 connects electromagnet coil 137 with a starting switch S and another conductor 149 connects this switch with the conductor 141 leading from transformer 36. When the synchronizing circuit is closed as will be hereinafter explained, electromagnet 37 becomes energized and the circuit breaker 31 closes.

The potential relay 35 includes in addition to the switch 135, an operating coil 138 which when energized closes the switch 135. This coil is connected by means of conductors 151 and 152 to the secondary of potential transformer 34.

In paralleling polyphase systems, the phase sequence of the generator voltages must be in the same rotative direction as that of the source of alternating current with which it is to be paralleled. Thus before making any attempts to synchronize the generator to the a-c. circuit, the generator connections must be so made that the phase sequence of the generator voltages corresponds to that of the a-c. circuit voltages. Since single-phase systems have only one phase voltage, this requirement obviously does not apply thereto.

The method of operation of the synchronizing device shown in Fig. 1 is as follows: Winding 14 is always connected to transformer 36 and is therefore energized by the a-c. circuit potential. Assuming that the a-c. circuit 9 is energized, the winding 14 will immediately close the armature 12 and thereby open switch 115 of synchronizer 10. Switch S is normally open. Likewise winding 13 is always connected to the transformer 34. Before the generator 30 is started up this winding is not energized by transformer 34. The generator 30 is next started and brought up to near synchronous speed in the usual manner by means of its prime mover. Potential relay 35 is set to operate at a predetermined voltage which may vary as found suitable. The synchronizer 10 is so designed that winding 13 becomes effective to operate in conjunction with winding 14 to maintain armature 12 in closed position until the electromotive forces of the generator and a-c. circuit are substantially alike in frequency and phase. Thus when the voltages of the a-c. circuit and generator are not substantially alike in frequency and phase, the armature 12 remains closed. Switch S is closed in any suitable manner, either manually or automatically, or directly or by remote control. If there is no direct-current excitation on the field winding 32 of the generator, the potential relay 35 will not close which holds the synchronizing circuit open and thereby prevents energization of the electromagnet 37 and the connection of the generator circuit to the a-c. circuit 9. If there is ample direct-current excitation on the generator, the resulting generated voltage will energize the potential relay 35 which closes its switch 135. At approximately 97% to 103% of synchronous speed, the synchronizing device will operate as soon as the electromotive forces of the generator and circuit are substantially alike in phase relationship. Then the armature 12 drops open and closes switch 115 which energizes the electromagnet 37 to close the circuit breaker 31, and thereby connects the generator 30 to the a-c. circuit 9. Thereafter normal operation occurs. To disconnect the generator from the a-c. circuit 9 and shut down its prime mover, the power to the prime mover is first reduced, then the switch S is opened which deenergizes the synchronizing circuit. This opens the circuit breaker 31 and thereby disconnects the generator 30 from the a-c. circuit 9. Then the power to the prime mover is fully cut off and the generator field winding 32 deenergized, and thereafter the generator and prime mover come to a standstill.

The theory of operation of my invention will now be explained. Assume that the generator 30 is ready to be synchronized and paralleled with the a-c. circuit 9. For proper synchronizing, it is well known that the electromotive forces of the generator and circuit must be substantially alike in frequency and phase. Winding 14, being connected to the a-c. circuit, is responsive in frequency and phase to the a-c. circuit voltage, and winding 13 is similarly responsive to the generator voltage. Fig. 3 shows the synchronizing device when the electromotive forces of the generator and circuit are not alike in phase. Winding 14 produces a magnetomotive force at a certain instant of time which results in flux flowing in the magnetic circuit 22 in a counterclockwise direction. Winding 13 similarly produces a magnetomotive force at the same instant of time which results in flux flowing in the magnetic circuit 23 in the same direction. Both fluxes pass through the armature 12 and air gaps 121 and 122 and will cooperate to pull up or close the armature 12, thereby opening the switch 115. When the electromotive forces of the generator and a-c. circuit are alike in frequency and phase, the synchronizing device will operate as shown in Fig. 2. At a corresponding instant of time to that assumed above, the flux produced by winding 14 in magnetic path 114 is in the same direction as before while that produced by winding 13 in magnetic path 113 is now in a clockwise direction. The resultant flux will then flow in magnetic circuit 24 in a clockwise direction. Due to the reversal of direction of the flux produced by winding 13 there will be substantially complete elimination of flux in armature 12 and the force of gravity will open the armature 12 so as to close the switch 115 which operates to close the synchronizing circuit as heretofore described.

For a better understanding of the operation of the invention under varying conditions, reference is to be had to Fig. 4 in which the various voltages are represented vectorially. For the purpose of discussion it will be assumed that the a-c. circuit voltage is equal to the generator voltage.

At a certain instant of time the a-c. circuit voltage and the generator voltage would have a certain phase relation. These voltages are represented by the vectors OC and OG. At certain other instants of time these voltages would have different phase relations. If the a-c. circuit voltage vector is assumed to be fixed at OC, the generator voltage vector would rotate about O as a center, the locus of the point G of said vector being the circle GACD. The synchronizing device will operate to close its armature 12 on an adjustable voltage CD, equal for instance to approximately 65% of normal voltage. Since the generator voltage OG may not be equal to the a-c. circuit voltage OC when synchronizing is desired, the point D will not always lie on the generator circle GACD. The locus of point D of voltage CD is shown by circle NDHM. The same device will operate to drop or open its armature 12 at a lower voltage than CD, such as voltage CA and its locus may be shown by circle FABE. Perfect paralleling operation occurs when the generator voltage OG coincides with the a-c. circuit voltage OC. I have referred to the voltage corresponding to the flux produced in armature 12 as the synchronizing voltage.

At all times this synchronizing voltage is equal to the vector difference of the circuit voltage OC and the generator voltage OG. Assuming the generator voltage OG to revolve in a clockwise direction when the generator is operating below synchronous speed and beginning at the position when OG is at OD, the synchronizing voltage CD will operate to close the armature 12 and thereby hold open the switch 115. When the generator voltage has rotated to the position OG, the generator and a-c. circuit voltages are exactly 180 degrees out of phase so that the synchronizing voltage, CG, is maximum and thereby continues to hold the armature 12 closed. When the generator voltage has rotated to the position OA, the synchronizing voltage CA is insufficient to hold the armature 12 closed so that if allowed sufficient time, the armature 12 will drop open to close the switch 115 which operates to close the synchronizing circuit and to connect the generator to the a-c. circuit. The time allowed for the armature 12 to drop open and close the switch 115 and for the circuit breaker 31 to close is the interval of time that the generator voltage takes to rotate from position OA to OD, since at OD the synchronizing device would again operate to close the armature 12. The synchronizing device may be adjusted to operate between 97% and 103% of synchronous speed. In that case an incoming generator could stop accelerating at 97% speed and the circuit breaker 31 would just be closed before vector OG reached position OD. With the same setting if the generator were to continue accelerating it would eventually be connected to the circuit somewhere between 97 and 103% speed if conditions for synchronizing were proper once during that time interval. It thus becomes apparent that my synchronizing device will function only within a limited range of speed and frequency, and within a limited phase difference so that the electromotive forces of the incoming generator and circuit are substantially alike in frequency and phase.

If the incoming generator voltage OG should fail to fall in phase with the a-c. circuit voltage when accelerating up to synchronous speed, then the generator will accelerate beyond synchronous speed in which case the generator voltage OG will rotate in a counterclockwise direction. This phenomena is well known in the indicating synchronoscope art in which the needle rotation indicates "slow" and "fast". Assume the generator is accelerating above 100% synchronous speed. Then the generator voltage OG rotating in a counterclockwise direction will produce a synchronizing voltage which operates to close the armature 12 at point M, and hold the armature 12 closed until reaching point P. At point P the synchronizing voltage CP is insufficient to hold the armature closed so that it drops open to close the switch 115 and effect the paralleling connection of the incoming generator to the a-c circuit. Thus proper phase relation for actuating the synchronizing device may occur at 101% speed (at point P) and the paralleling effected at point C or phase coincidence of the incoming generator voltage and the a-c. circuit voltage. It is a well known fact that the generator has a longer time interval in which to synchronize between 102% and 103% synchronous speed than between 97% and 98% speed while the inrush current is substantially the same. Accordingly, the synchronizing device will operate on every occasion when the proper frequency and phase relation exist and therefore functions positively.

The magnitude of the incoming generator voltage OG may be adjusted in the normal manner by varying the direct-current excitation to the generator. If the generator voltage were below normal value, such as equal to that of vector OF in Fig. 4, the resulting synchronizing voltage would be proportional to a voltage vector drawn from C to F, and the synchronizing device would operate at a point nearer phase coincidence than that when both generator and circuit voltages were equal. Also, if the generator voltage were above normal value, such as equal to that of vector OB, the resulting synchronizing voltage would be proportional to a voltage vector drawn from C to B, and the synchronizing device would again operate at a point nearer phase coincidence than that when both generator and circuit voltages were equal. Thus it becomes evident that my synchronizing device will operate even though the incoming generator voltage may be somewhat higher or lower than the a-c. circuit voltage.

Figure 5:
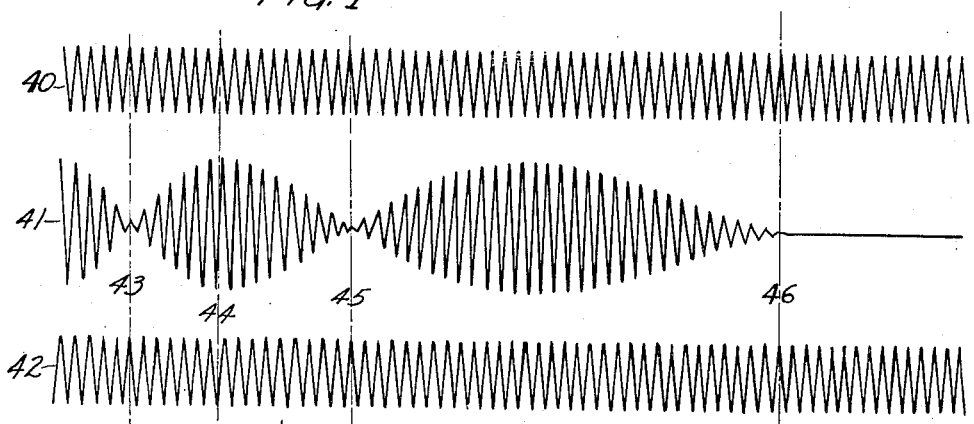
Fig. 5 is a conventional representation of an oscillogram of the voltages shown in Fig. 4, before, during and after the paralleling operation.

In Fig. 5 I have shown a conventional representation of an oscillogram of the a-c. circuit voltage, the synchronizing voltage and the generator voltage. The upper oscillographic wave 40 represents the secondary voltage of transformer 36 (Fig. 1) which is responsive to the a-c. circuit voltage of phase bc. The center wave 41 represents the synchronizing voltage to which the synchronizer 10 is responsive. The lower wave 42 represents the secondary voltage of transformer 34 which is responsive to the generator voltage of its phase BC during the period when the generator 30 is accelerating to synchronous speed and is synchronized with the a-c. circuit. The synchronizing voltage as previously stated corresponds to the flux produced in armature 12. The synchronizing voltage may be obtained oscillographically by connecting a high resistance (not shown) across the left side of the two windings 13 and 14 in Fig. 1 and taking the voltage from the right side terminals of windings 13 and 14 to the oscillograph. This voltage may be considered as that induced in a winding having the same number of turns wound around the armature 12 and it is responsive to the synchronizing voltage CD of Fig. 4. Since the three waves are respectively proportional to the a-c. circuit voltage OC, the synchronizing voltage CA, and the generator voltage OG, the waves will be designated in this specification by the same names. Obviously, if no potential transformers were used, the voltages across the windings and across their sources of alternating current would be equal to one another. At instant 43 in Fig. 5, the generator voltage 42 is in phase with the a-c. circuit voltage 40 for a very short duration of time so that the resulting synchronizing voltage is low, but the frequency or speed of the generator 30 is also low so that the synchronizer 10 maintains its armature 12 in closed position. At instant 44, the two voltages are 180 degrees out of phase resulting in a large synchronizing voltage equal to the sum of the circuit voltage and the generator voltage to hold the armature 12 of the synchronizer in closed position. At instant 45, the voltages are again in phase but the frequency or speed of the generator is still too low for satisfactory paralleling and the synchronizer maintains its armature 12 in closed position. At instant 46, the voltages are again in phase with each other resulting in a low synchronizing voltage for a duration of time sufficient for the synchronizer 10 to drop or open its armature 12 which closes the switch 115 and energizes electromagnet 37 to close circuit breaker 31. Thus the generator 30 is synchronized and paralleled with the a-c. circuit and normal running operation occurs after instant 46 during which the generator voltage is always in phase with the a-c. circuit voltage.

Figure 7:
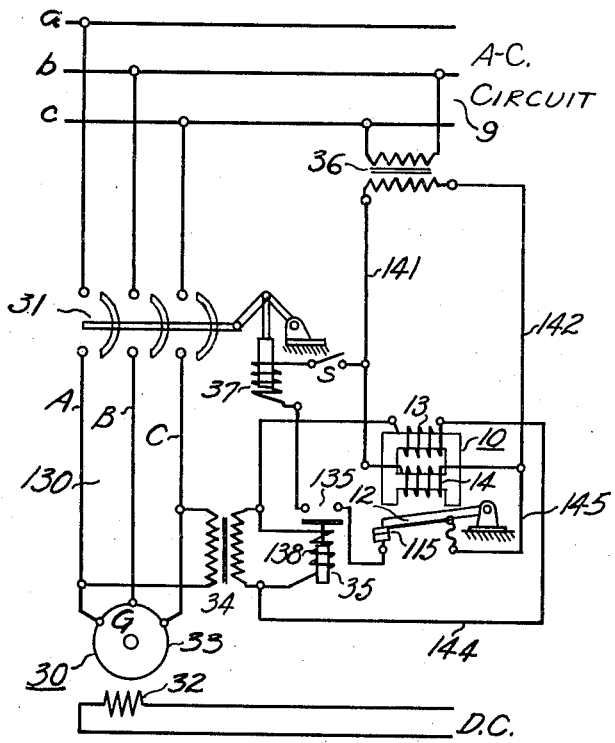
Fig. 7 is a wiring diagram of a modification of the invention in which the paralleling operation is initiated in advance of the occurrence of phase coincidence.

In order to connect the generator to the a-c. circuit at exact phase coincidence of the generator voltage and the a-c. circuit voltage it becomes necessary to initiate the paralleling operation in advance of phase coincidence. This I accomplish by means of the device shown in Fig. 7. Inasmuch as all of the elements of this form of the invention are substantially the same as those of the form of the invention shown in Fig. 1 the description thereof will not be repeated and the same reference numerals will be used to designate corresponding parts. In this form of the invention, transformer 36 is connected to phase bc of the a-c. circuit 9 the same as in the other form. However the transformer 34 is connected to phase AC of generator circuit 130. Also the connections of this transformer are reversed. Aside from the fact that a circuit breaker is utilized which has an appreciable time lag the other elements and their manner of connection are the same.

Figure 8:
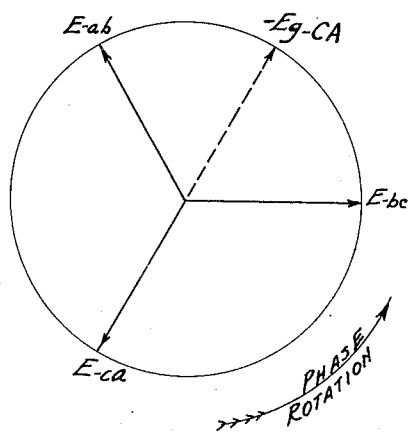
Fig. 8 is a vector diagram of the voltages involved in the modification of the invention shown in Fig. 7.

In Fig. 8 I have shown voltage vectors of the A. C. circuit and generator circuit entering into the operation of the form of the invention shown in Fig. 7. In Fig. 8, E—bc represents the phase voltage from b to c of the a-c. circuit shown in Fig. 7, and E—ca and E—ab represent the phase voltages of the remaining circuit phases. Eg—BC represents the generator voltage of phase BC, while —Eg—CA represents the generator voltage of phase CA, but connected to the synchronizing device in reversed direction. Thus the windings 13 and 14, of the synchronizing device now cooperate 60 degrees in advance of their former time of operation to cause the synchronizing and paralleling operation which thereby allows additional time for the slower-acting coils and circuit breaker, or for advance synchronizing. By selecting a circuit breaker with proper time lag, the generator may be connected to the a-c. circuit at substantially synchronism.

My synchronizing device is simple in both the mechanical and electrical aspects, yet operates at a high degree of accuracy in synchronizing and paralleling two alternating-current sources at the proper frequency and phase. My invention is very inexpensive, easily adjusted and requires the minimum of maintenance. The synchronizing device will not operate if either of its windings 13 or 14 is burned out, or if the direct-current field excitation has failed or if the generator has failed to reach substantially synchronous speed.

It will be understood that my invention is applicable to single-phase, three-phase, and other polyphase systems. It will also be understood that it is not limited to merely synchronizing and paralleling a generator to an a-c. circuit, since obviously it can also be used to synchronize two alternating circuits in an electrical network or to synchronize one generator with another generator. In many existing plants, synchronizing is obtained by the use of lamps which are subject to unexpected burn-outs and failures. In such plants, my synchronizing device may be used to indicate the instant of synchronism so that the operator may manually close the circuit breaker when the two voltages are substantially alike in frequency and phase.

It will, of course, be understood that various changes may be made in the form, proportions and arrangement of the parts, without departing from the scope of my invention, which, generally stated, consists in a device capable of carrying out the objects above set forth and in the novel parts and combination of parts disclosed and defined in the appended claims. Further, I do not desire to limit myself to the particular connections shown and described, but aim in the appended claims to cover all modifications which are within the scope of my invention.

What I claim as new and desire to secure by Letters Patent of the United States is:

1. In a synchronizing device for use in paralleling two sources of alternating current, a magnetic core providing three circuitous parallel magnetic paths, a winding disposed on a portion of said core forming one of said magnetic paths and responsive to one of said sources of alternating current, another winding disposed on a portion of said core forming another of said magnetic paths and responsive to the other of said sources of alternating current, an air gap in said third magnetic path, and an armature movable to close said air gap.

2. In a synchronizing device for use in paralleling two sources of alternating current, a magnetic core providing three circuitous parallel magnetic paths, a winding on a portion of said core forming one of said magnetic paths and energized by a voltage corresponding in frequency and phase with the voltage of one source of alternating current, another winding on a portion of said core forming another of said magnetic paths and energized by a voltage corresponding in frequency and phase with the voltage of the other source of alternating current, an air gap in said third magnetic path, and an armature movable to close said air gap.

3. In a synchronizing device for use in paralleling two sources of alternating current, a magnetic core providing three circuitous parallel magnetic paths, a winding on a portion of said core forming one of said magnetic paths and energized by a voltage corresponding in frequency and phase with the voltage of one source of alternating current, another winding on a portion of said core forming another of said magnetic paths and energized by a voltage corresponding in frequency and phase with the voltage of the other source of alternating current, an air gap in said third magnetic path, an armature movable to close said air gap, and circuit closing means actuated by said armature for connecting said sources of alternating current together.

4. In a synchronizing device for use in paralleling two sources of alternating current, a magnetic core having two legs, end pieces connecting said legs together, said end pieces extending outwardly beyond one leg and forming pole pieces spaced to provide an air gap therebetween, an armature adapted to extend across said pole pieces and movable to close said air gap, a winding on one of said legs energized by a voltage corresponding in frequency and phase with the voltage of one of said sources of alternating current, and another winding on said other leg, said winding being energized by a voltage corresponding in frequency and phase with the voltage of said other source of alternating current.

5. In a synchronizing device for use in paralleling two sources of alternating current, said device comprising a magnetic core E-shaped in form having two outside legs, a center leg and an end piece connecting said legs together at corresponding ends, an armature adapted to bridge said outside legs and movable toward and from said center leg, a winding on one of said outside legs energized by a voltage corresponding in frequency and phase with the voltage of one of said sources of alternating currents, and another winding on said other outside leg energized by a voltage corresponding in frequency and phase with the voltage of said other source of alternating current.

6. In a synchronizing device for use in paralleling two sources of alternating current, a magnetic core providing three circuitous parallel magnetic paths, a winding on a portion of said core forming one of said paths and energized by a voltage corresponding in phase and frequency with the voltage of one source of alternating current, another winding on a portion of said core forming another of said magnetic paths and energized by a voltage corresponding in phase and frequency with the voltage of the other source of alternating current, an air gap in said third magnetic path, and an armature movable to open and close said air gap, said windings being connected in a manner to neutralize the flux passing thru said air gap when the voltages of said sources of alternating current are substantially alike in frequency and phase.

7. In a synchronizing device for use in paralleling two sources of polyphase alternating current, a magnetic core providing three circuitous parallel magnetic flux paths, a winding on a portion of said core forming one of said magnetic flux paths and energized by a voltage corresponding in frequency and phase with the voltage of a phase of one source of alternating current, another winding on a portion of said core forming another of said magnetic paths and energized by a voltage corresponding in frequency and phase with the voltage of a phase of the other source of alternating current other than the phase corresponding with said denoted phase of the first named source, an air gap in said third magnetic path, and an armature movable to close said air gap.

8. In a synchronizing device for use in paralleling two sources of polyphase alternating current, a magnetic core providing three circuitous parallel magnetic paths, a winding on a portion of said core forming one of said magnetic paths and energized by a voltage corresponding in frequency and phase with the voltage of a phase of one source of alternating current, another winding on a portion of said core forming another of said magnetic paths and energized by a voltage corresponding in frequency and phase with the voltage of the phase of the other source of alternating current leading the phase corresponding with the denoted phase of said first named source, one of said windings being connected so as to procure reversal of voltage therein, an air gap in said third magnetic path, and an armature movable to close said air gap.

9. In a synchronizing device for use in paralleling two sources of alternating current, a magnetic core providing a magnetic circuit, an air gap in said circuit, an armature movable to close said air gap, a winding on said core energized by a voltage corresponding in frequency and phase with the voltage of one source of alternating current and providing a magnetomotive force tending to produce flux in the armature of said magnetic circuit, and another winding on said core energized by a voltage corresponding in frequency and phase with the voltage of the other source of alternating current, said winding providing a magnetomotive force tending to produce flux in said armature, said last named winding being connected so as to cause substantially complete elimination of flux in said armature when the voltages of said sources are substantially alike in frequency and phase.

10. In a synchronizing device for use in paralleling two sources of alternating current, a magnetic core providing a magnetic circuit, an air gap in said circuit, an armature movable to close said air gap, a winding on said core energized by a voltage corresponding in frequency and phase with the voltage of one source of alternating current and providing a magnetomotive force tending to produce flux in said magnetic circuit, and another winding on said core energized by a voltage corresponding in frequency and phase with the voltage of the other source of alternating current, said winding providing a magnetomotive force tending to produce flux in said armature, said last named winding being connected so as to cause substantially complete elimination of flux in said armature when the voltages of said sources are substantially alike in frequency and phase, said core being constructed to provide another magnetic circuit in which the magnetomotive forces provided by said windings produce flux when the voltages of said sources are substantially alike in frequency and phase.

11. In a synchronizing device for use in paralleling two sources of alternating current, a magnetic core constructed with two legs each having a winding thereon, said core forming a circuitous magnetic path including an air gap, an armature movable to close said air gap, said core being constructed to form two magnetic circuits, one circuit including said legs in parallel and said air gap, and the other circuit including said legs in series, said windings being energized by voltages corresponding in frequency and phase with the voltages of said sources of alternating current and being connected to produce flux thru said first named magnetic circuit when the voltages of said sources differ in frequency or phase, and to produce flux in said second-named circuit when the voltages of said sources of alternating current are substantially alike in frequency and phase.

12. In a system of the class described wherein two sources of polyphase alternating electromotive force are to be connected together, means for connecting said sources, and means for controlling the closing of said connecting means comprising a magnetic core having two legs and an armature, a winding on one of said legs responsive to a certain phase voltage of one of said sources, a second winding on the remaining leg responsive to a different phase voltage of the second source, one of said phase voltages being in advance phase position with respect to the other phase voltage whereby the said armature operates in advance of phase coincidence for starting the connecting operation of said connecting means.

13. A synchronizer for paralleling two sources of alternating current comprising a magnetic core having at least two legs and an armature, a winding on one of said legs responsive to one of said sources of alternating current, a second winding on another leg responsive to the other of said sources of alternating current, an electric circuit controlled by said armature for connecting the sources of alternating current together, said circuit being rendered operable upon the resultant flux through said armature approaching zero.

EDWIN W. SWANSON.